W. V. TURNER.
EMPTY AND LOAD BRAKE APPARATUS.
APPLICATION FILED JULY 17, 1912.
1,125,215.
Patented Jan. 19, 1915.
2 SHEETS—SHEET 1.
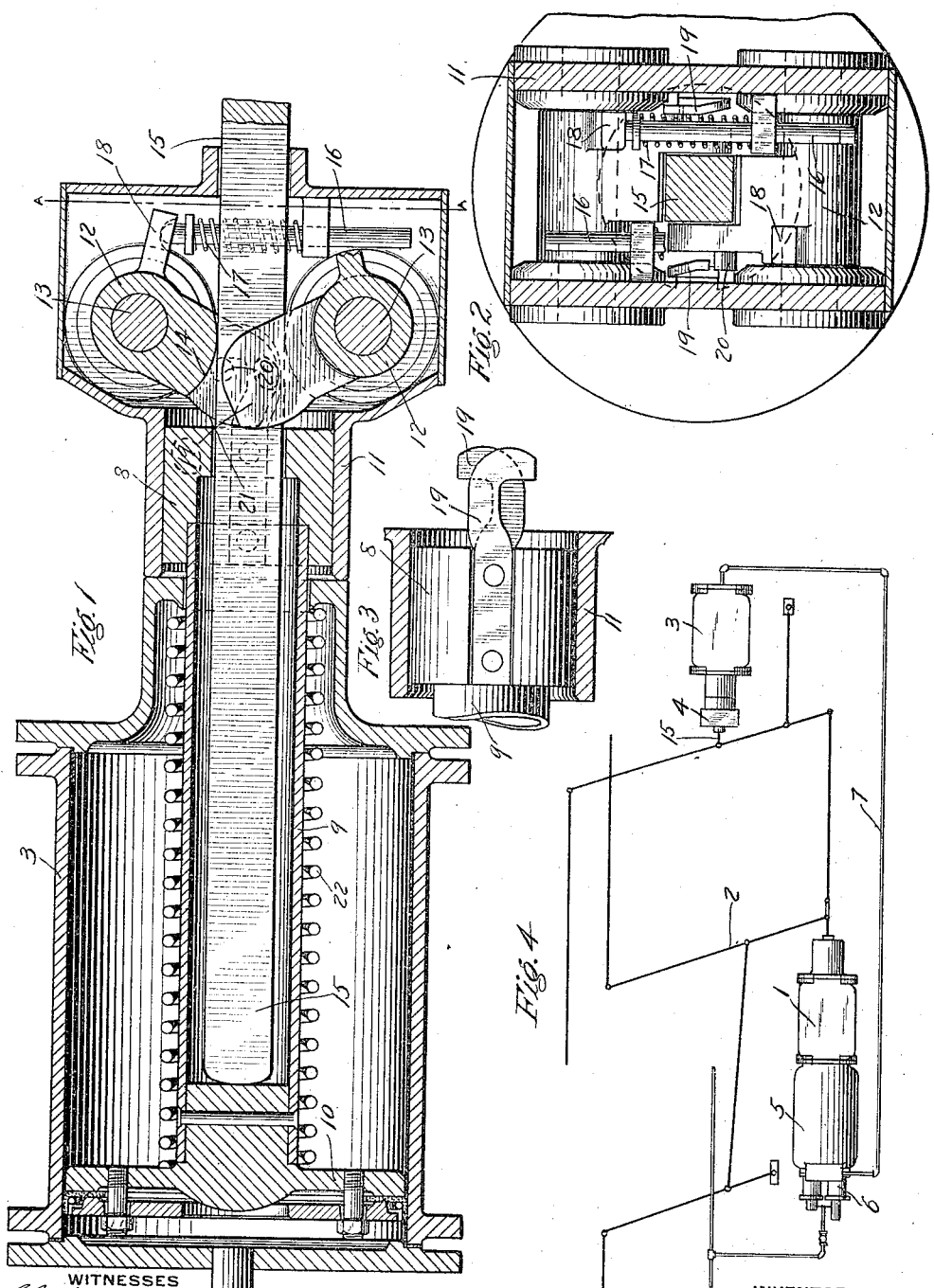

W. V. TURNER.
EMPTY AND LOAD BRAKE APPARATUS.
APPLICATION FILED JULY 17, 1912.
1,125,215.
Patented Jan. 19, 1915.
2 SHEETS—SHEET 2.
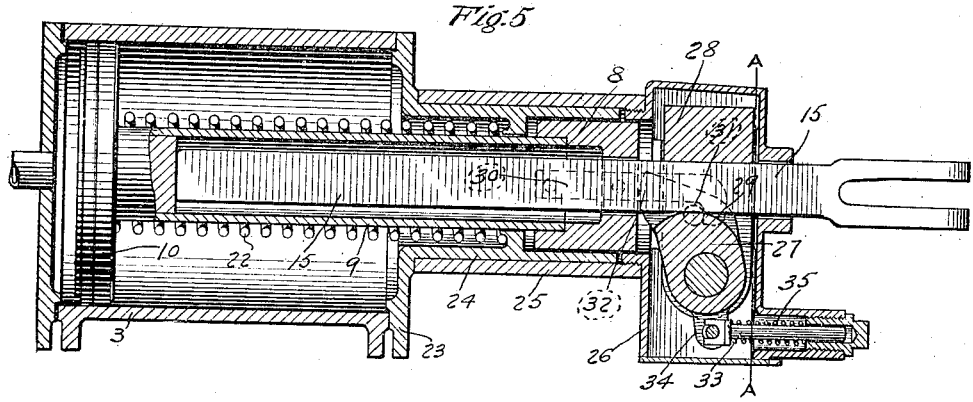
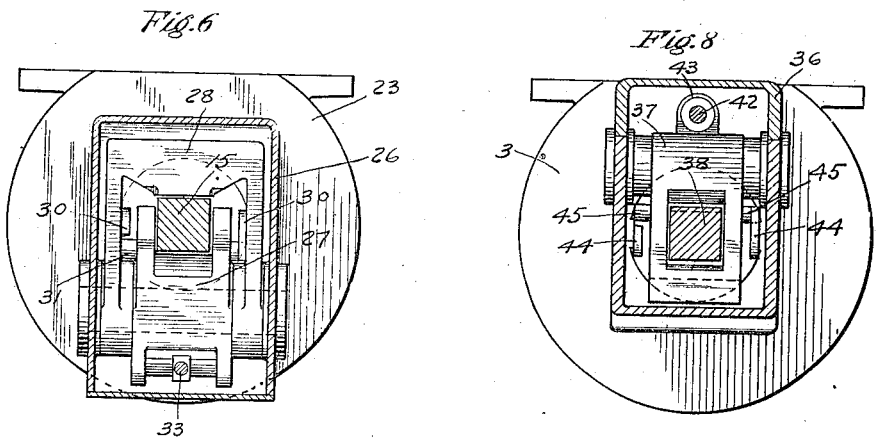
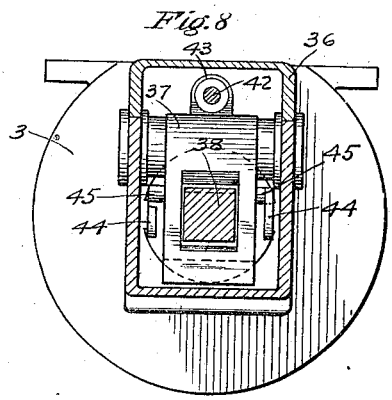
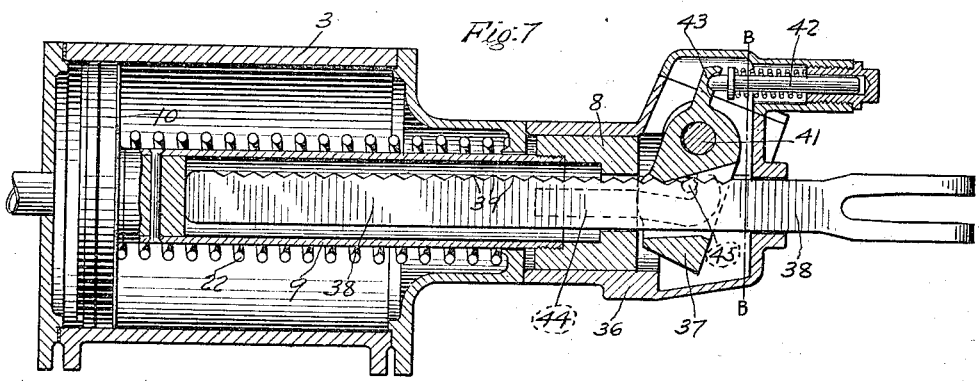
WITNESSES
INVENTOR
Walter V. Turner
by Wm. M. Cady
Att'y.

UNITED STATES PATENT OFFICE.

WALTER V. TURNER, OF EDGEWOOD, PENNSYLVANIA, ASSIGNOR TO THE WESTING-HOUSE AIR BRAKE COMPANY, OF WILMERDING, PENNSYLVANIA, A CORPORATION OF PENNSYLVANIA.

EMPTY AND LOAD BRAKE APPARATUS.

1,125,215.  Specification of Letters Patent.  Patented Jan. 19, 1915.

Application filed July 17, 1912.  Serial No. 709,942.

*To all whom it may concern:*

Be it known that I, WALTER V. TURNER, a citizen of the United States, residing at Edgewood, in the county of Allegheny and State of Pennsylvania, have invented new and useful Improvements in Empty and Load Brake Apparatus, of which the following is a specification.

This invention relates to fluid pressure brakes, and more particularly to a brake apparatus in which two brake cylinders are employed, one brake cylinder at one time and both brake cylinders at another time. A construction of the above character is often employed in connection with an empty and load brake apparatus where one brake cylinder is adapted to provide braking power for empty or light cars and both brake cylinders are employed to provide increased braking power on loaded cars. Another type of brake apparatus in which two brake cylinders are sometimes employed is that in which one brake cylinder is adapted to act first in applying the brakes to take up the slack and apply the brake shoes to the wheels and the second brake cylinder is then cut in to secure the desired braking power. Where two brake cylinders are employed, in order to provide for the transmission of power from the second brake cylinder to the brake rigging, it has heretofore been proposed to provide a clutch mechanism adapted upon the movement of the second brake cylinder piston to automatically connect said piston to the brake rigging. With clutch mechanisms heretofore employed for the above purpose, it has been found that occasionally under certain conditions the clutch mechanism will fail to release and one object of the present invention is to provide an improved clutch mechanism adapted to positively release at all times.

Another object of my invention is to provide a generally improved and simplified clutch mechanism construction.

In the accompanying drawings; Figure 1 is a central sectional view of a brake cylinder with one form of the improved clutch mechanism applied thereto; Fig. 2 a transverse section on line A—A of Fig. 1; Fig. 3 a sectional view of a detail of the construction shown in Fig. 1; Fig. 4 a diagrammatic view of an empty and load brake apparatus for a car, embodying my invention; Fig. 5 a central sectional view of a brake cylinder provided with a slightly modified form of my improvement; Fig. 6 a sectional view on line A—A of Fig. 5; Fig. 7 a central sectional view of a brake cylinder provided with a clutch mechanism embodying another modification; and Fig. 8 a sectional view on the line B—B of Fig. 7.

In Fig. 4 of the drawings is shown diagrammatically an empty and load brake apparatus comprising a brake cylinder 1 connected to the car brake rigging 2 for empty car braking and a second brake cylinder 3 adapted to be connected to the brake rigging 2 through the operation of the clutch mechanism 4, a reservoir 5 and a valve mechanism 6 being provided for controlling the admission and release of fluid under pressure to and from the brake cylinder 1 and also through pipe 7 to and from the load brake cylinder 3.

According to the form of my invention illustrated in Fig. 1, the clutch mechanism may comprise a crosshead 8 secured to hollow piston rod 9 of brake cylinder piston 10. Mounted to slide on the crosshead 8 is a cam box 11 within which are hung opposing cams 12 pivotally mounted on pins 13. Each cam is provided with a cam surface 14 adapted upon outward movement of the cams to grip the opposite sides of the push rod 15. A sliding pin 16 acted upon by a spring 17 engages a lug 18 on each cam and tends to rotate the cam so as to grip the push rod. Secured to opposite sides of the crosshead 8 are cam hooks 19 adapted to engage release pins 20 mounted on each cam 12.

In operation, the brake cylinder 1 shown in Fig. 4 having operated to apply the brake shoes to the wheels and having pulled out the push rod 15 with the movement of the brake rigging 2, when air is supplied to the brake cylinder piston 10, the same moves out, as shown in Fig. 1, and the crosshead 8 pushes against bearing faces 21 on the cams 12, thereby forcing the cams outwardly, assisted by the springs 17. The cam faces 14 are thus caused to grip the opposite sides of the push rod 15 and further movement of the piston 10 causes all of the parts to move out together. Upon releasing air from the brake cylinder piston 10 to release the brakes, the release spring 22 moves the piston and crosshead 8 back to release position and in this movement, the hooks 19 engage the release pins 20 on the cams 12 and thus pull the cams out of engagement with the push rod 15, so that the push rod is free to return to release position.

A slightly modified construction is shown in Fig. 5 of the drawings, in which the non-pressure head 23 of the brake cylinder 3 is provided with a cylindrical extension 24 forming a bearing for a sleeve 25 secured to the cam box 26. A single cam 27 is provided, which is pivotally mounted on a yoke 28, the cam surface 29 of the cam being adapted to engage one face of the push rod 15 and thereby grip the push rod between the cam and the yoke. The crosshead 8 is provided on opposite sides with hooks 30 adapted to hook over release pins 31 carried by the cam 27. The cam 27 has inwardly extending lugs 32 adapted to engage with the outer lateral face of the crosshead 8 and to assist the gripping action of the cam, a rod 33 pivotally connected to a lug 34 on the cam 27 is provided, spring 35 on said rod being adapted to supply the required spring pressure. The operation of this form of my improvement is similar to that of the construction shown in Fig. 1, except that only one cam is employed for gripping the push rod and the arrangement of the cam box 26 to slide on the cylindrical extension of the non-pressure head instead of on the crosshead 8. This arrangement may be preferable in some cases, as there is some friction between the crosshead and the cam box which might be sufficient to cause the parts to move out before the cam has gripped the push rod.

According to the modification shown in Figs. 7 and 8, the latch box 36 slides on crosshead 8 as in the Fig. 1 construction. A latch 37 is employed instead of the gripping cam, and the push rod 38 is provided with a series of notches 39 on one side with which the latch 37 is adapted to engage. The latch 37 is pivotally mounted in the latch box 36 on a pin 41 and a spring pressed rod 42 engages a lug 43 on the latch for assisting in the movement of the latch to engage the notches on the push rod. Hooks 44 are secured to opposite sides of the crosshead 8 as in the previously described constructions, and are adapted to engage release pins 45 carried by the latch 37. It will be apparent that the operation of this modification is substantially the same as those previously described, except that a notched push rod and latch is employed instead of the cam.

It will also be noted that, according to my improvement, the brake cylinder piston has a movement relative to the clutch device and as the piston is operatively connected to the gripping members, said gripping members are moved upon the initial movement of the piston in applying the brakes to effect a gripping action on the push rod and upon initial movement of the piston to release the brakes, the release hooks act on the gripping members, by reason of the relative movement between the clutch device and the piston, and thereby free the gripping members from engagement with the push rod. By making the angles of the gripping members outwardly divergent with respect to the brake cylinder piston, upon relative inward movement of the push rod, the tendency of the gripping members is to move away from the push rod and thereby permit the free inward movement of said push rod.

Having now described my invention, what I claim as new and desire to secure by Letters Patent, is:—

1. In a fluid pressure brake, the combination with a brake cylinder, a piston therein, and a push rod mounted in said piston, of a clutch device for operatively connecting said piston to said push rod comprising a gripping member inclined toward the piston, and means operated upon the initial movement of the piston in releasing the brakes for releasing the gripping member.

2. In a fluid pressure brake, the combination with a brake cylinder, a piston therein and a push rod carried by said piston, of a clutch device for operatively connecting the brake cylinder piston with the push rod, said clutch device having a gripping member at an angle opposed to the movement of the piston and push rod in applying the brakes, and means carried by the piston for releasing the gripping member upon the initial movement of the piston in releasing the brakes.

3. In a fluid pressure brake, the combination with a brake cylinder, a piston therein provided with a hollow stem, and a push rod mounted in said stem, of a clutch device for operatively connecting said piston to said push rod comprising a gripping member inclined toward the piston, and means operated by the movement of the piston in applying the brakes for causing said member to grip the push rod, the initial movement of the piston in releasing the brakes being adapted to free the push rod from the gripping action of said gripping member.

4. In a brake mechanism, the combination with a brake cylinder, a piston therein, and a push rod mounted in said piston, of a clutch device for operatively connecting said piston to said push rod and means operated by said piston upon a movement thereof relative to said clutch device for causing the clutch device to grip the push rod.

5. In a brake mechanism, the combination with a brake cylinder, a piston therein, and a push rod mounted in said piston, of a clutch device for operatively connecting said piston to said push rod and having a gripping member, and means carried by said piston and operated thereby upon a movement thereof relative to the push rod in applying the brakes for causing the gripping member to grip the push rod and adapted upon movement of the piston relative to the push rod in releasing the brakes to release the gripping member and thereby permit the free release movement of the push rod.

6. In a brake mechanism, the combination with a brake cylinder containing a brake piston and a push rod for transmitting power from the brake piston to apply the brakes, of a clutch device having a gripping member for operatively connecting the push rod with the brake piston, a crosshead carried by said piston and provided with means for operating said gripping member to grip the push rod in the movement to apply the brakes and adapted in releasing the brakes to release the gripping member and thereby permit free release movement of the push rod.

7. In a brake mechanism, the combination with a brake cylinder containing a brake piston and a push rod for transmitting power from the brake piston to apply the brakes, of a clutch device having a gripping member for operatively connecting the push rod with the brake piston, a crosshead carried by said piston and adapted to operatively engage said gripping member in the movement to apply the brakes, and a hook member mounted on said crosshead for engaging said gripping member in the movement to release the brakes.

8. In a brake mechanism, the combination with a brake cylinder containing a brake piston and a push rod for transmitting power from the brake piston to apply the brakes, of a clutch device having a gripping member for operatively connecting the push rod with the brake piston, a crosshead carried by said piston and having a movement relative to the clutch device and adapted to operatively engage said gripping member to thereby cause the gripping member to grip the push rod upon movement of the piston to apply the brakes, hook members mounted on said crosshead, and release pins secured to said gripping member and adapted to be engaged by said hook members in the movement to release the brakes, to thereby free the gripping member from engagement with the push rod.

In testimony whereof I have hereunto set my hand.

WALTER V. TURNER.

Witnesses:
A. M. CLEMENTS,
E. C. TRAUTMAN.

Copies of this patent may be obtained for five cents each, by addressing the "Commissioner of Patents, Washington, D. C."